United States Patent [19]

Wolters

[11] 4,268,237
[45] May 19, 1981

[54] APPARATUS FOR MANUFACTURING A TUBULAR BODY PROVIDED WITH A SEALING RING

[75] Inventor: Hendrik W. Wolters, Diepenheim, Netherlands

[73] Assignee: Hawo B.V., Goor, Netherlands

[21] Appl. No.: 134,096

[22] Filed: Mar. 26, 1980

[51] Int. Cl.³ .......................... B29C 1/14; B29D 9/00; B29D 23/02; B29F 1/022
[52] U.S. Cl. .................................. 425/116; 264/255; 264/267; 277/1; 277/72 FM; 277/207 A; 277/DIG. 6; 425/117; 425/120; 425/127; 425/130; 425/183; 425/184; 425/190; 425/414; 425/574; 425/577
[58] Field of Search .................... 425/127, 129 R, 185, 425/190, 110, 117, DIG. 47, 423, 412, 414, 416, 542, 577, 116, 120, 130, 183, 184, 574; 264/255, 267, 259, 318, 328; 277/1, 207 A, 72 FM, DIG. 6

[56] References Cited

U.S. PATENT DOCUMENTS

| | | | |
|---|---|---|---|
| 1,641,793 | 9/1927 | Watson | 425/110 |
| 2,986,411 | 5/1961 | Anderson | 264/274 |
| 3,074,111 | 1/1963 | Wiltshire | 425/129 |
| 3,293,693 | 12/1966 | Ohl et al. | 425/126 |
| 3,677,687 | 7/1972 | Siegfried et al. | 425/412 |
| 3,861,646 | 1/1975 | Douglas | 264/267 |
| 4,111,623 | 9/1978 | Black | 425/117 |
| 4,127,632 | 11/1978 | Anger | 264/318 |
| 4,134,431 | 1/1979 | Davidson et al. | 425/127 |

Primary Examiner—W. E. Hoag
Attorney, Agent, or Firm—Diller, Ramik & Wight

[57] ABSTRACT

Apparatus for manufacturing an at least partly tubular body, provided with an elastic sealing ring accomodated in an internal groove in said member. In a moulding cavity of a mould first the tubular member is formed of plastic synthetic material, thereafter an annular cavity is arranged in the mould adjacent the outer surface of the body and subsequently a pressurized thermoplastic deformable material is brought against the inner surface of said body which material is an elastomer at the temperature of its normal use. Thereby the body is forced into the annular cavity and is simultaneously forming the internal groove, which is filled with elastomeric material.

8 Claims, 10 Drawing Figures

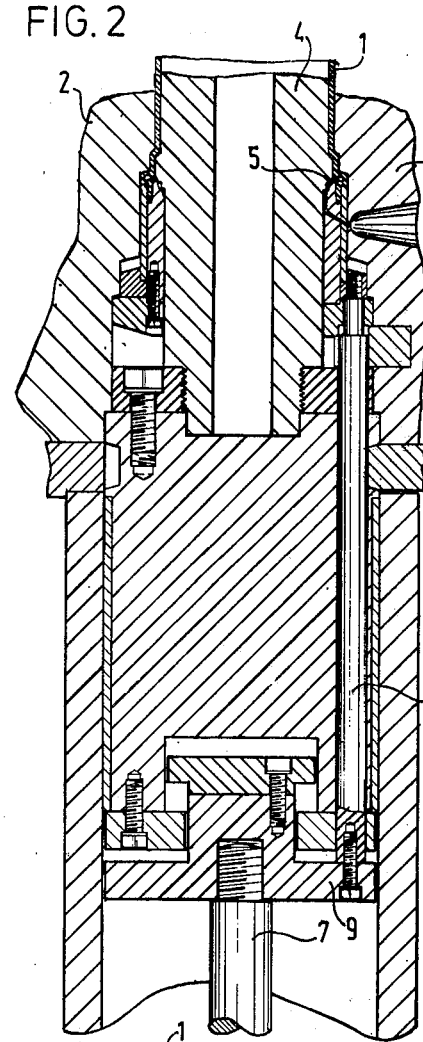
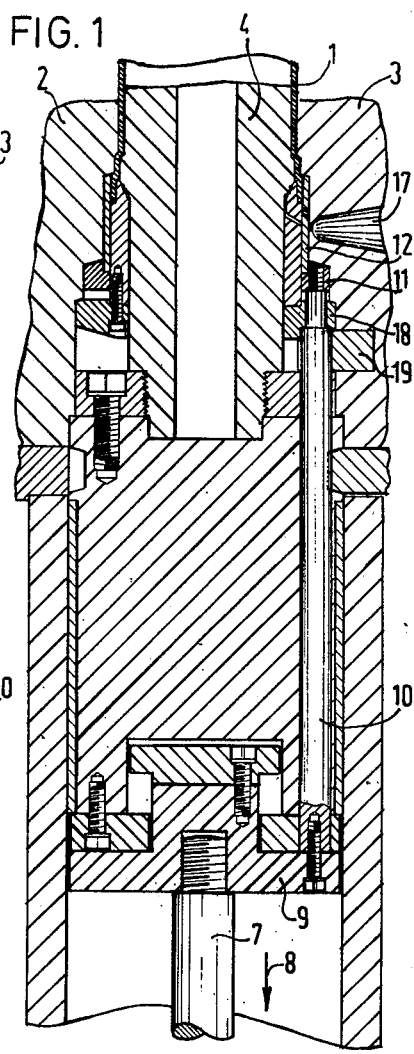
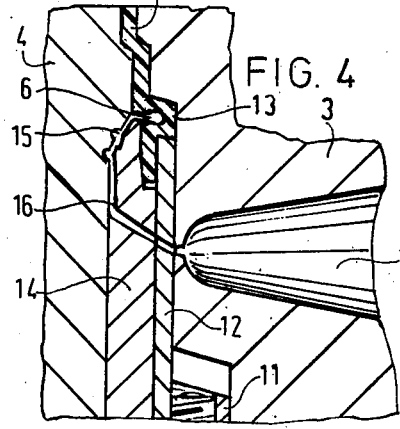
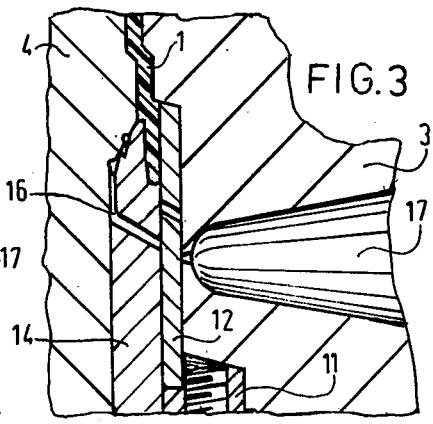

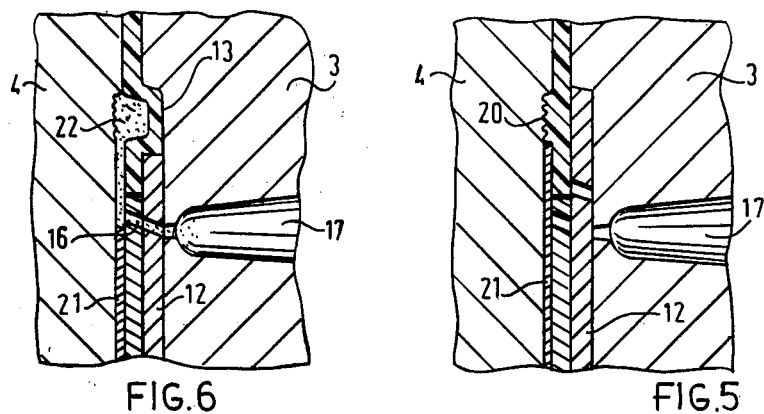
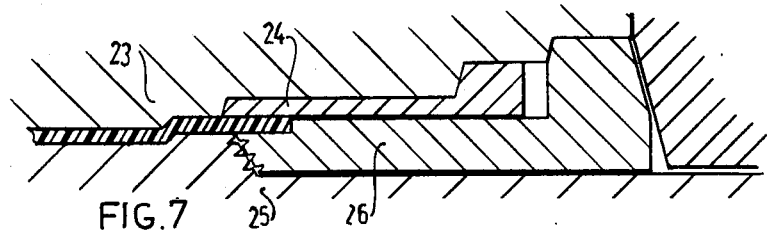
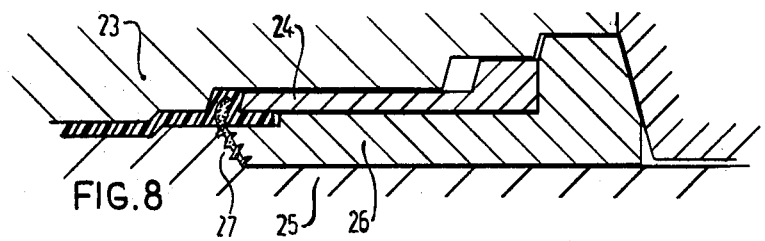
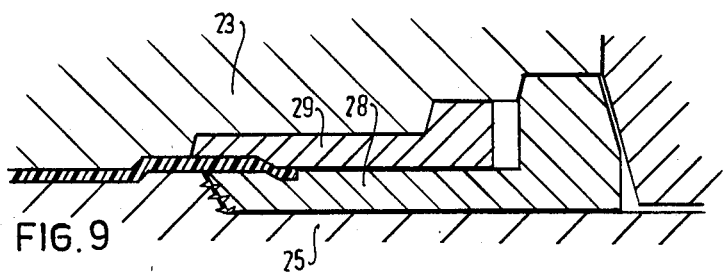
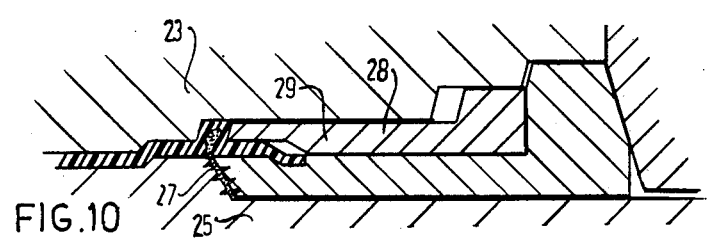

APPARATUS FOR MANUFACTURING A TUBULAR BODY PROVIDED WITH A SEALING RING

The invention relates to a method for manufacturing a tubular body provided with an elastic sealing ring accomodated in an internal groove by filling a mould having an at least tubular moulding cavity with plastic synthetic material, arranging an annular cavity in the mould adjacent the outer surface of the plastic tubular body bringing a pressurized material against the inner surface of the body just across the internal recess. A similar method is known from German patent Application No. 1,303,655 in which method after arranging the annular cavity in the mould at the outer surface of the body which is still warm and thereby deformable, pressurized air is brought against the inner surface of the body thereby widening it in the region of the annular cavity whereby an annular internal groove is formed. After being sufficiently rigified the body is removed from the mould and provided with a sealing ring by accomodating it into said groove.

Said method can be simplified by using a thermoplastic deformable, at the temperature of its normal elastomeric material, bringing this in the required shape and stabilising it.

The term elastomeric material means a material having at the temperature of its normal use, viz. 10° to 50° C., clearly elastic properties, whereby said material may be subject to relatively important deformations without breaking while resuming almost directly its original shape after removing the load. Stabilizing in the desired shape is normally done by cooling down.

By using said method of tubular body having a sealing ring firmly arranged therein is made in one throughgoing manufacture while preventing the cumbrous insertion of the ring by hand and the inevitable faults.

In order to reduce damaging the just moulded sealing ring when removing the tubular body and the sealing ring from the mould removing the outer mould wall at least between the annular cavity and the nearest open end of the tubular body after having moulded the sealing ring is advisable prior to dragging the inner mould wall through the sealing ring. By this feature the easy deformability of the just moulded body is used since this body in a warm condition can be easily widened by dragging the core of the mould through the sealing ring, whereafter the tubular body resumes almost its original shape by reason of its thermoplastic memory. In this method a tubular body may be used having almost equal diameters at both sides of the sealing ring. Even a tubular body can be made being somewhat narrowed at its open end, presenting the advantage of a reduced risk of damaging the sealing ring when inserting another tubular body into the tubular body having a sealing ring inserted.

The invention also relates to an apparatus for putting the method into practice.

The invention will be explained in the following description in connection with the accompanying drawings wherein four preferred embodiments are shown.

FIGS. 1 and 2 are two axial longitudinal sections through a part of a mould in two different positions.

FIGS. 3 and 4 are showing details of FIGS. 1 and 2 respectively.

FIGS. 5 to 10 are showing details corresponding FIGS. 3 and 4 respectively of modified embodiments of the mould of the invention.

In FIGS. 1 and 2 corresponding sections through a portion of a mould for manufacturing a tubular body 1 are shown: FIG. 1 shows a position wherein the tubular body can be moulded such as be extrusion in the moulding cavity delimited by a dividable mould jacket 2, 3 and a core 4, and FIG. 2 shows a position wherein the sealing ring 5 can be moulded. Details of these sections are shown at a larger scale in FIGS. 3 and 4 respectively.

The extrusion mould shown only partly in the drawings is mainly formed by a core 4, surrounded by a moulding jacket which can be divided in an upper mould section 3 and a lower mould section 2. These parts are delimiting a moulding cavity wherein a tubular body 1 has been moulded by extrusion. For arranging a groove 6 in the inner surface of said tubular body a hydraulic or pneumatic cylinder unit (not shown) is energized such that a piston rod 7 thereof is moved in the direction as indicated by the arrow 8. The disk 9 being connected to the piston rod 7, the pulling rods 10 connected thereto and the supporting ring 11 being connected with the free ends of the pulling rods 10 and being coaxially slidable about the core 4 can be moved together with the piston rod in this manner. Thereby the annular element 12 which is connected with the supporting ring 11 is shifted with respect to the mould jacket 2, 3, thereby forming a cavity 13 at the outer surface of the tubular body 1. By pressurizing the inner surface of the still plastic tubular body 1 its material is pressed into the cavity 13 and an internal groove 6 is formed. This state is shown in FIGS. 2 and 4.

Pressurizing is done in the invented method by feeding thermoplastic deformable, elatomeric raw material for the sealing ring against the inner surface of the tubular body just across the site when the annular cavity 13 has been arranged. Then said material is brought in the desired shape and stabilized. Several elastomeric materials may be used as a raw material, provided these materials are thermoplastic deformable, such that plastic deformation and transport through the feeding system in the mould are possible and subsequent stabilisation in that shape is possible.

For giving the sealing ring 5 the desired shape an annular section 14 is slidably in axial direction arranged about the core. In one position the inward face of said annular section 14 is abutting a corresponding face of the core, such that no space for plastic material for the tubular body is available. This condition is shown in FIG. 3. By axial movement towards the outside of the mould, viz. in the direction f the arrow 8, an annular moulding cavity 15 formed between said faces of the core and the annular section, its shape corresponding with that of the sealing ring 5 to be moulded. This moulding cavity is connected to a feeding channel 16, through which elastomeric raw material for the sealing ring may be extruded from a extrusion connection 17 to said cavity. In the extrusion connection a nozzle of an extrusion apparatus can be inserted. For keeping the length of said feeding channel 16 short, the extrusion connection is preferably arranged in the moulding jacket near the sealing ring to be moulded and is the feeding channel extending through the annular element 12.

The displacement of the annular section 14 also results from energizing the cylinder and so from moving the rods 10 relatively to the moulding jacket and the core. After a short axial displacement of the support ring 11, it abuts a second support ring 18 being also coaxially slidable about the core. Said second support ring is connected with the annular section 14 so that by further axial displacement of the rods 10 the support ring 11 and now the support ring 18 too and the annular section 14 are moved until the second support ring 18 abuts a stop 19 in the moulding shell and the position shown in FIGS. 2 and 4 is obtained. By feeding pressurized raw material for the sealing ring through the extrusion connection 17 and the feeding channel 16 into the moulding cavity 15 for said ring 5, the inward groove in the tubular body is formed and also the sealing ring 5 is suitably moulded and arranged in said groove. The shape of said ring is fixed or stabilized by cooling thereby solidifying the material. A subsequent cross-linking may be arranged such as by radiation, but is mostly not necessary. The stabilized condition being obtained the tubular body having the sealing ring inserted may be removed from the mould in a usual manner. It is important that the internal diameter of the open end of the tubular body outward of the sealing ring is slightly in excess of the internal diameter beyond said ring for preventing damaging the sealing ring when removing the core from the tubular body. A simple embodiment to be used when the sealing ring needs only to extend by some millimetres inwardly is shown in FIGS. 5 and 6 showing sections of modified simple embodiments comparable with FIGS. 3 and 4. In this embodiment no separate moulding cavity is used for moulding the sealing ring but the core is provided with a shallow annular groove 20 where the ring is to be arranged. Said groove may be connected with the feeding channel 16. In the starting position as shown in FIG. 5 synthetic material is extruded into the moulding cavity for the tubular body 1, whereby the annular groove 20 is filled too. By retracting a key 21 in the inner surface of the moulding cavity until the position of FIG. 6 is obtained the feeding channel for raw material for the sealing ring extends from the extrusion connection to the annular groove 20 such that when extruding said raw material the still plastic deformable resin of the tubular body will be moved into the annular cavity 13 while forming an internal groove which is simultaneously filled with the sealing ring 22. Said ring only slightly extends inwardly and will not obstruct the removal of the core. For improving the sealing the annular groove 20 is preferably provided with annular peripheral ridges for providing the ring with corresponding ridges. Shifting the key 21 obtained in the same manner as that of the annular section 14 by energizing a hydraulic or pneumatic cylinder for moving one or more support rings for said parts in the manner as shown in FIGS. 1 and 2 through the disc 9 and the rods 10.

In FIGS. 7 and 8 a partial section through a modified embodiment of a mould is shown in a similar manner as in FIGS. 3 and 4. As shown in FIG. 7, that portion of the moulding cavity formed between the moulding jacket 23, the slidable annular element 24 the core 25 and the slidable annular section 26 provides a terminal sleeve portion on the moulded tubular body which is of enlarge diameter. The inner ends of annular element 24 and the annular section 26 both terminate about half way along the length of this terminal sleeve portion.

When removing the tubular body from the mould first the annular element 24 and the annular section 26 are retracted and thereafter the core 25 is pulled through the sealing ring 27 as shown in FIG. 8. Then the open end of the tubular body can be radially widened for giving room to the radially widened sealing ring 27.

Similar sections are shown in FIGS. 9 and 10, being different from those shown in FIGS. 7 and 8 in that the moulding cavity at the free end of the sleeve portion is radially marrowed. When removing the moulded tubular body first the annular element 28 is retracted and only thereafter the annular section 29, thereby radially widening the sleeve at its open end. After being passed the sleeve resumes its original shape. The same occurs when the core is pulled through the sealing ring 27.

I claim:

1. Apparatus for making a tubular article having an annular groove in an inner surface thereof and for forming an annular seal ring in said groove, the combination comprising:

a core element surrounded by a shell member, said core element and said shell member having therebetween an at least partly cylindrical mold cavity, an axially displaceable annular element at least partly defining an outer wall of said mold cavity and said core element at least partly defining an inner wall of said mold cavity and also at least partly defining a channel, which can be closed, communicating with said mold cavity and an injection port in said displaceable annular element.

2. The apparatus of claim 1, wherein the extrusion connection (17) is arranged in one of the halves of the moulding shell (3) and the feeding channel (16) extends partly through the annular element (12).

3. The apparatus of claim 1, wherein the moulding cavity at the open end of the tubular body to be moulded has a smaller inner diameter than in the region of the sealing ring (5).

4. The apparatus of claim 1, wherein the core (4) is having a relatively axially displaceable part (14, 21) having its axial limit just across an annular cavity (13) to be formed between the mould shell (2, 3) and the annular element (12).

5. The apparatus of claim 4, wherein the movable part (14) is annular and is displaceable between a position wherein it abuts the core (4) with its inner extremity and a postion wherein its tapered end and the opposite surface of the core are defining the desired shape for moulding the sealing ring (5).

6. The apparatus of claim 5, wherein the inner diameter of the moulding cavity at the side towards the nearest end thereof is in excess of that directly at the other side of the moulding cavity for the sealing ring.

7. The apparatus of claim 4, wherein the displaceable part (21) is shaped as a key extending in the inner surface of the moulding cavity and is displaceable between a position wherein one extremity is positioned at a shallow annular groove (20) in the core (4) and a position wherein said extremity frees the feeding channel (16) from the extrusion connection (17) to the said groove (20).

8. The apparatus of claim 7, wherein the shallow groove (20) is provided with annular ridges.

* * * * *